May 15, 1934.  B. J. UKROPINA  1,958,872
CONCRETE PIPE CONSTRUCTION
Filed Jan. 17, 1931  2 Sheets-Sheet 1
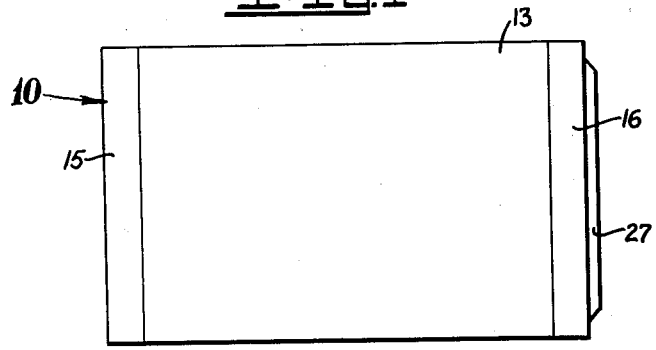
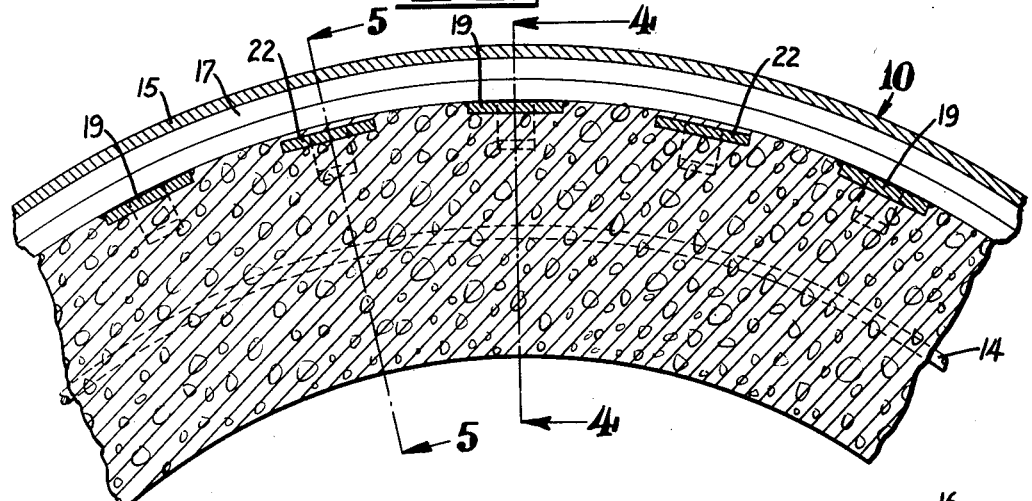
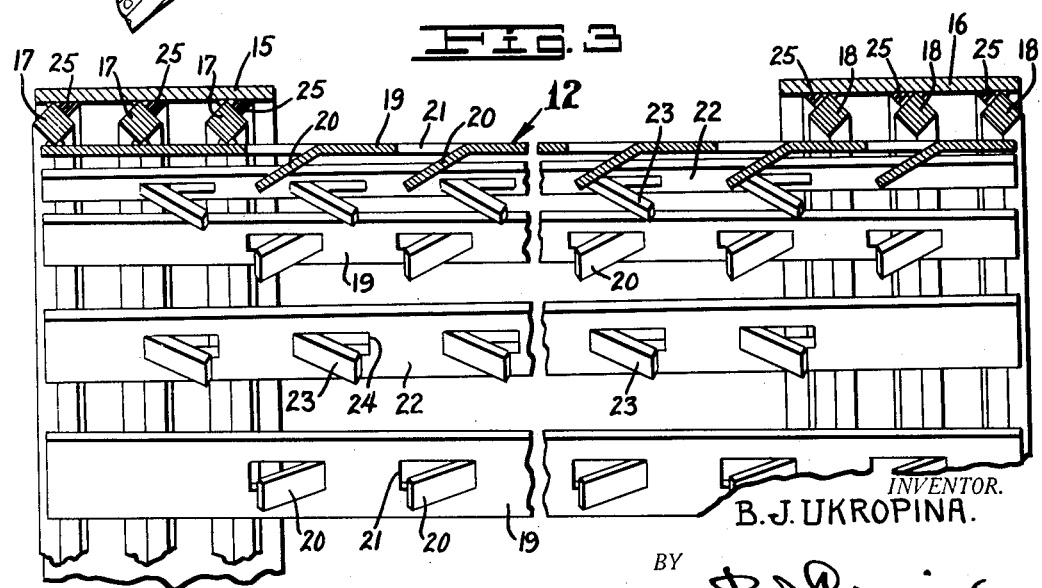
INVENTOR.
B. J. UKROPINA.
BY
ATTORNEY.

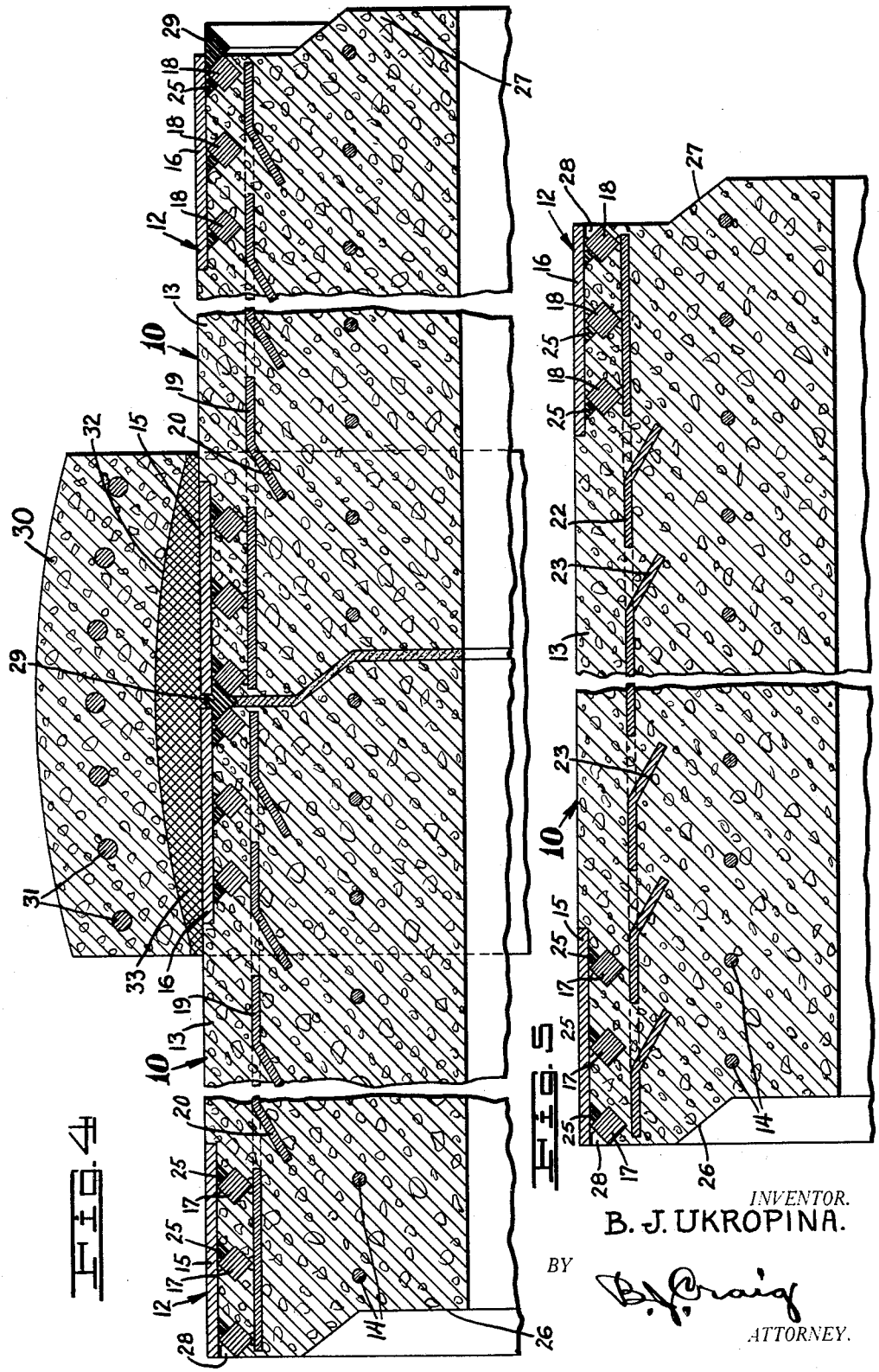

Patented May 15, 1934

1,958,872

UNITED STATES PATENT OFFICE 1,958,872

CONCRETE PIPE CONSTRUCTION

Bozidar J. Ukropina, Los Angeles, Calif.

Application January 17, 1931, Serial No. 509,375

7 Claims. (Cl. 72—53)

This invention relates to improvements in concrete pipes.

The general object of this invention is to provide an improved concrete pipe having a novel reinforcing means.

Another object of the invention is to provide a novel joint for sections of concrete pipe.

A further object of my invention is to provide a pipe joint including an improved collar.

An additional object of my invention is to provide an improved reinforcing cage for a concrete pipe.

Other objects and advantages of this invention will be apparent from the following description taken in connection with the accompanying drawings wherein:

Fig. 1 is a side elevation of a concrete pipe embodying the features of my invention.

Fig. 2 is an enlarged fragmentary cross section through the pipe.

Fig. 3 is an enlarged fragmentary longitudinal section through my improved reinforcing cage.

Fig. 4 is a section taken on line 4—4 of Fig. 2, showing two lengths of pipe joined together with my improved collar and Fig. 5 is a section taken on line 5—5 of Fig. 2.

Referring to the drawings by reference characters I have indicated a length of concrete pipe embodying the features of my invention generally at 10. As shown this pipe includes a metal reinforcing cage which is indicated generally at 12 embedded in moulded concrete 13 which may also have other reinforcing means embedded therein such as rods as indicated at 14.

The reinforcing cage 12 includes end bands 15 and 16 which are positioned at each end of the pipe with their outer surface flush with the outer surface of the concrete 13. Secured to the inner face of the band 15 as by welding I provide a plurality of spaced rings 17 which are preferably polygonal in cross section and engage the band with one of their edges with their sides at an angle thereto as clearly shown in Fig. 3. Similar rings 18 are secured to the inner face of the band 16.

Secured to the inner edges of the rings 17 as by welding I provide a plurality of spaced bars 19 which extend longitudinally of the pipe with their ends preferably unexposed. These bars 19 are not secured to the rings 18 on the band 16. Each of the bars 19 include a plurality of spaced tongues 20 which are punched out of the bar and leave an aperture 21. The tongues 20 are shown as bent inward at an angle with the free ends thereof towards the rings 17 to which they are secured.

Secured to the inner edges of the rings 18 of the band 16 as by welding I provide a plurality of spaced bars 22 which extend longitudinally of the pipe and alternate circumferentially with the bars 19 as clearly shown in Figs. 2 and 3. The ends of the bars 22 are preferably unexposed and are free from the rings 17 of the band 15. (See Fig. 5.) Each of the bars 22 include a plurality of spaced tongues 23 which are punched out of the bar leaving apertures 24. The tongues 23 are bent inward at an angle with the free ends thereof towards the rings 18 to which they are secured.

It will be understood of course that the tongues on the bars 19 and 22 may be bent outward if desired or some of them may be bent inward and others thereof bent outward.

Positioned against the upper inner faces of the rings 17 and 18 and against the inner surfaces of the bands 15 and 16 I provide resilient packing rings 25 which are preferably made of rubber. When the cement 13 is moulded on the reinforcing cage 12 the cement compresses the packing rings 25 and forces them into tight engagement with the surfaces of their respective rings and bands thereby forming a fluid tight joint between the bands and the rings so that should a crack occur in the cement along the inner face of a band or along the angular surface of one of the rings no fluid would pass the packing ring.

When the concrete 13 is moulded on the reinforcing cage 12 the concrete passes through the apertures 21 in the bars 19 as shown in Fig. 4 and the apertures 24 of the bars 22 as shown in Fig. 5. The concrete 13 is provided at the end adjacent the band 15 with a bell recess 26 and at the end adjacent the band 16 with a protruding spigot portion 27. The space between the upper outer surfaces of the outer rings 17 and 18 and the inner faces of their associated bands is not filled with concrete thereby providing an annular angular groove 28 in each end of the pipe.

When a length of pipe 10 is to be joined to another a resilient packing ring 29 is positioned in the groove 28 of one of the pipes and a collar 30 is positioned around one of the pipes. The packing ring 29 is preferably made of rubber and is normally shaped to conform to the shape of the grooves 29 in the ends of the pipes. When the two lengths of pipe are joined the packing ring 29 fits in the grooves of the adjacent pipe ends and the pipes are forced together to compress the packing ring and form a fluid tight joint between ends of the pipe as shown in Fig. 4.

To complete the assembly I surround the joint with the collar 30 which is preferably made of moulded concrete with reinforcing members 31 embedded therein and having its inner surface 32 arcuate and bowed outward.

After the packing ring 29 has been compressed the collar 30 is moved to a position over the adjacent ends of the pipe so that the center of the collar is approximately over the center of the packing ring 29 as shown in Fig. 4. A calking material 33 is then driven in the space between the outer surfaces of the pipes and the inner surface of the collar and tightly packed therein.

From the foregoing description it will be apparent that I have provided an improved concrete pipe and pipe joint which can be economically manufactured and is simple in construction and highly efficient in use.

Having thus described my invention, I claim:

1. A concrete pipe, said pipe including a reinforcing cage embedded therein, said reinforcing cage including an annular band portion exposed at each end of said pipe and a plurality of rings secured to the inner surface of each of said bands and embedded in said concrete.

2. A concrete pipe, said pipe including an annular metal reinforcement embedded therein, said reinforcement including a portion at each end of said pipe, a plurality of rings secured to the inner surface of each of said portions, and means to prevent leakage between said rings and said annular reinforcement.

3. For use in a concrete pipe, a metal reinforcing cage, said reinforcing cage including an annular metallic band, a plurality of rings secured to the inner surface of said band and a plurality of spaced longitudinally extending bars secured to the rings on said band.

4. For use in a concrete pipe, a metal reinforcing cage including a band, a plurality of spaced rings secured to the inner surface of said band, a plurality of spaced longitudinally extending bars secured to the rings on said band and a resilient packing ring engaging the inner surface of said band and the surface of one of said rings.

5. A concrete pipe, said pipe including a reinforcing cage embedded therein, said reinforcing cage including a band at each end of said pipe with the outer surfaces thereof exposed, a plurality of spaced rings secured to the inner surface of each of said bands, a plurality of circumferentially spaced longitudinally extending bars secured to said rings, a plurality of spaced tongues on said bars, said tongues being stamped from said bars and being inclined at an angle to said bars, resilient packing rings engaging the inner surfaces of said end bands and the inner surfaces of said rings.

6. A concrete pipe, said pipe including a reinforcing cage embedded therein, said reinforcing cage including a band at each end of said pipe, a plurality of spaced rings secured to the inner surface of each of said bands, a plurality of circumferentially spaced longitudinally extending bars secured to the rings on one of said end bands and a plurality of radially spaced longitudinally extending bars secured to the rings on the other of said end bands, said bars of one end band alternating with the bars of the other end band, a plurality of spaced tongues on said bars, said tongues being stamped from said bars and being inclined at an angle to said bars with the free ends of said tongues towards the end bands to which said bars are secured.

7. A concrete pipe, said pipe including a metal reinforcing cage embedded therein, said reinforcing cage including a band at each end of said pipe with the outer surfaces thereof flush with the outer surface of said pipe, a plurality of spaced rings secured to the inner surface of each of said bands, a plurality of spaced longitudinally extending bars secured to the rings on one of said end bands and a plurality of spaced longitudinally extending bars secured to the rings on the other of said end bands, said bars of one end band alternating with the bars of the other end band, a plurality of spaced tongues on said bars, said tongues being stamped from said bars leaving an aperture in said bars, said tongues being inclined at an angle to said bars with the free ends of said tongues towards the end bands to which said bars are secured, and resilient packing rings engaging the inner surfaces of said end bands and the surfaces of said rings.

BOZIDAR J. UKROPINA.